United States Patent [19]

Sasaki

[11] Patent Number: 4,839,892

[45] Date of Patent: Jun. 13, 1989

[54] CONCENTRATOR SYSTEM CAPABLE OF COMPLETING EMERGENCY CALLS UNDER CONGESTED TRAFFIC

[75] Inventor: Yasutaka Sasaki, Tokyo, Japan

[73] Assignee: NEC Corporation, Tokyo, Japan

[21] Appl. No.: 237,204

[22] Filed: Aug. 29, 1988

[30] Foreign Application Priority Data

Aug. 27, 1987 [JP] Japan .................. 62-213253
Aug. 27, 1987 [JP] Japan .................. 62-213257
Aug. 27, 1987 [JP] Japan .................. 62-213258

[51] Int. Cl.⁴ .............................. H04J 3/24
[52] U.S. Cl. ..................... 370/95; 379/45; 379/208
[58] Field of Search ............. 370/95; 379/37, 45, 379/49, 92, 243, 245, 201, 208

[56] References Cited

U.S. PATENT DOCUMENTS

| | | | |
|---|---|---|---|
| 3,694,584 | 9/1972 | Gimbert ........................... | 379/208 |
| 3,701,853 | 10/1972 | Duval et al. ..................... | 379/208 |
| 4,095,056 | 6/1978 | Ewen ................................. | 379/243 |
| 4,733,390 | 3/1988 | Shirakawa et al. ............. | 370/95 |
| 4,757,496 | 7/1988 | Bartholet et al. .............. | 370/95 |

Primary Examiner—Douglas W. Olms
Assistant Examiner—Min Jung
Attorney, Agent, or Firm—Sughrue, Mion, Zinn, Macpeak & Seas

[57] ABSTRACT

In a radio concentrator system formed by a central station and remote stations, demand-assigned data channels are constantly monitored to detect when they are congested. When an emergency call is received from a subscriber terminal, a dial tone is sent to the terminal if the emergency call occurs simultaneously with the detection of a congestion. On hearing the dial tone, the subscriber dials an emergency destination address, which is received by a remote station and compared with a list of predetermined addresses and verified if it matches one of the predetermined addresses. The dialed information is sent from that station to the central station, where it is relayed to a switched network. An emergency channel is established to the network for routing the emergency call. This channel may be permanently provided and demand-assigned in response to an emergency channel assignment request, or first selected by a remote station requesting an emergency call and access is granted by the central station if no collision occurs between competing emergency calls. Alternatively, no emergency channel is provided in the system and one of the data channels is cleared when an emergency call is detected simultaneously with the occurrence of a congestion. The cleared channel is used as an emergency channel to complete the emergency call.

7 Claims, 13 Drawing Sheets

REMOTE CONTROLLER 24

CENTRAL CONTROLLER 14

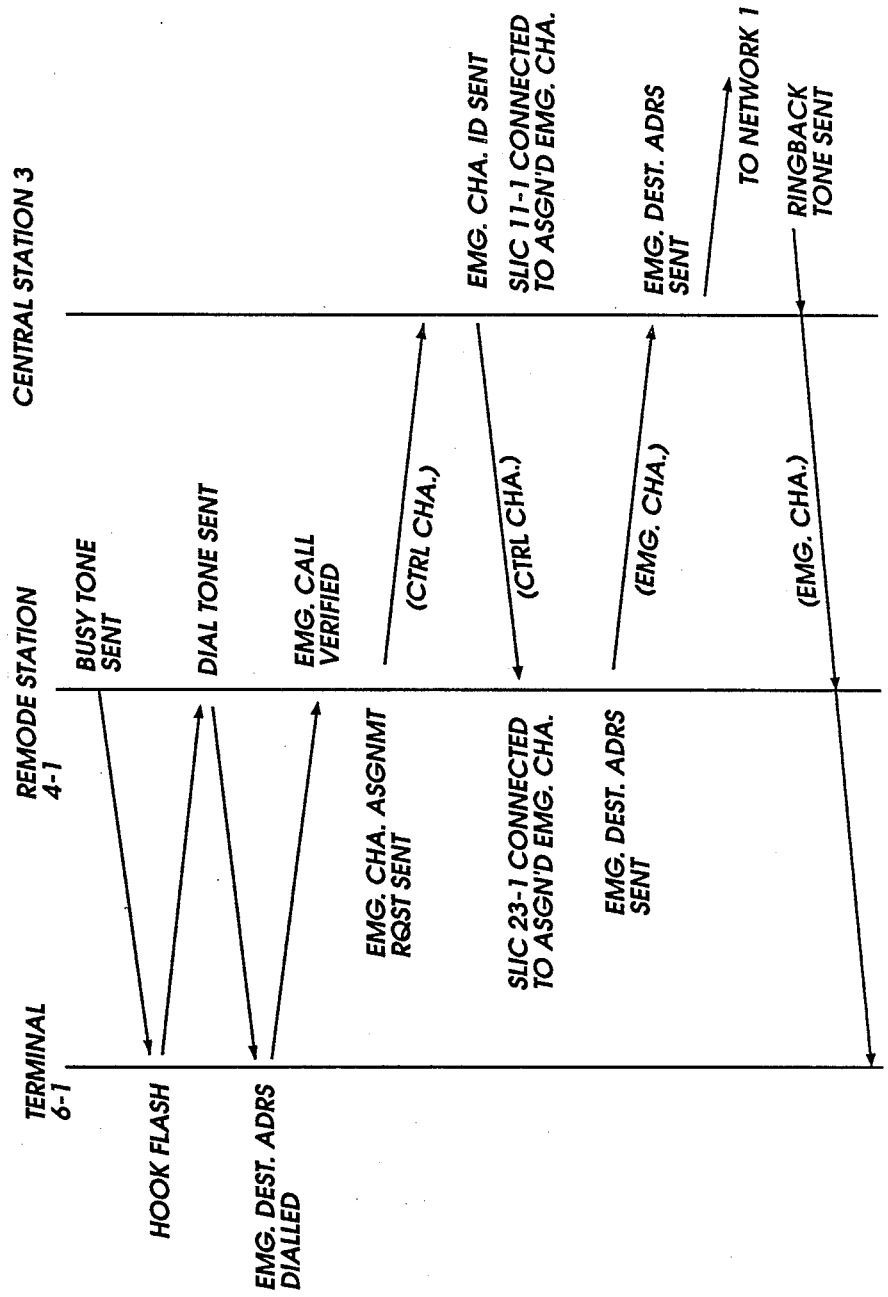

REMOTE CONTROLLER 24

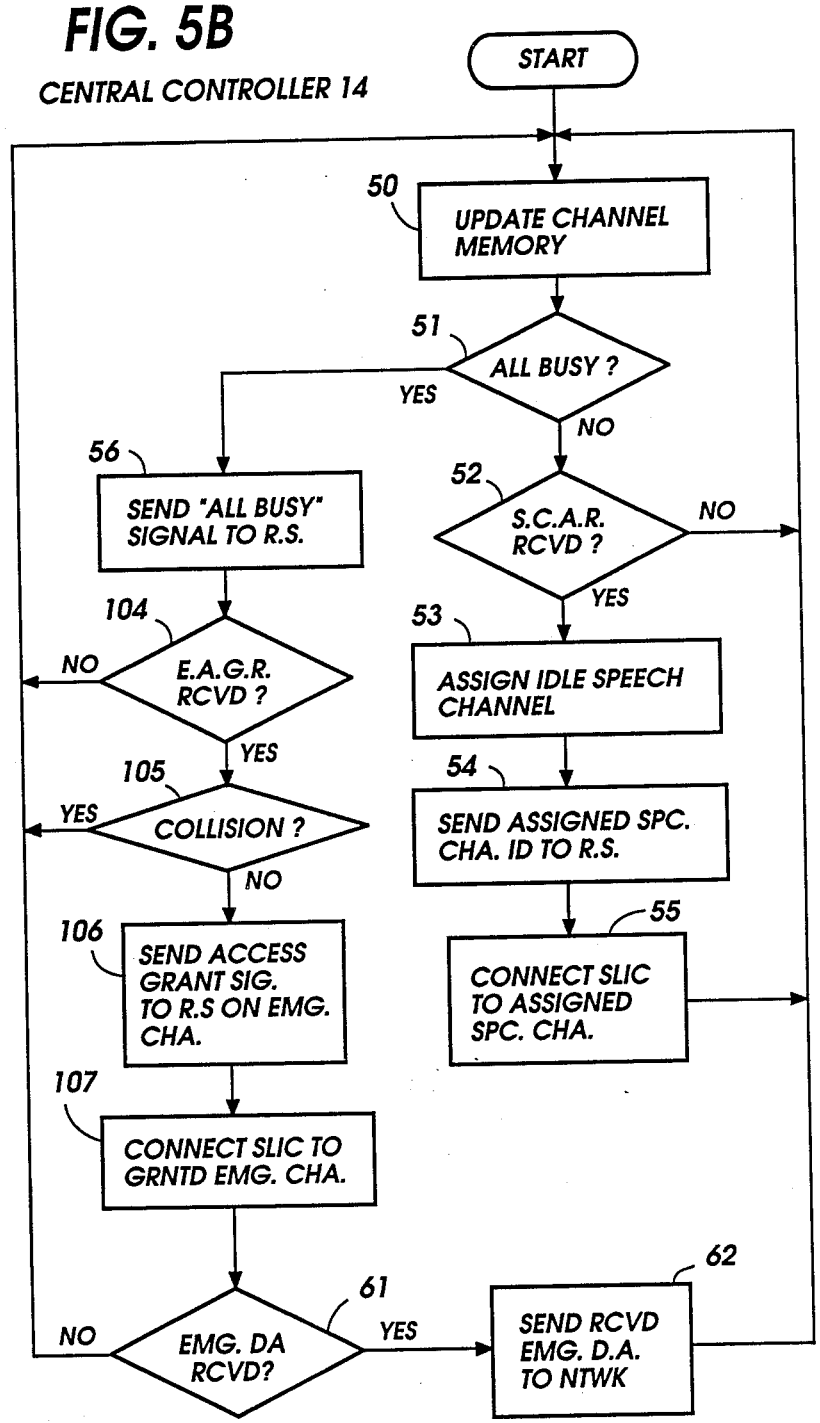

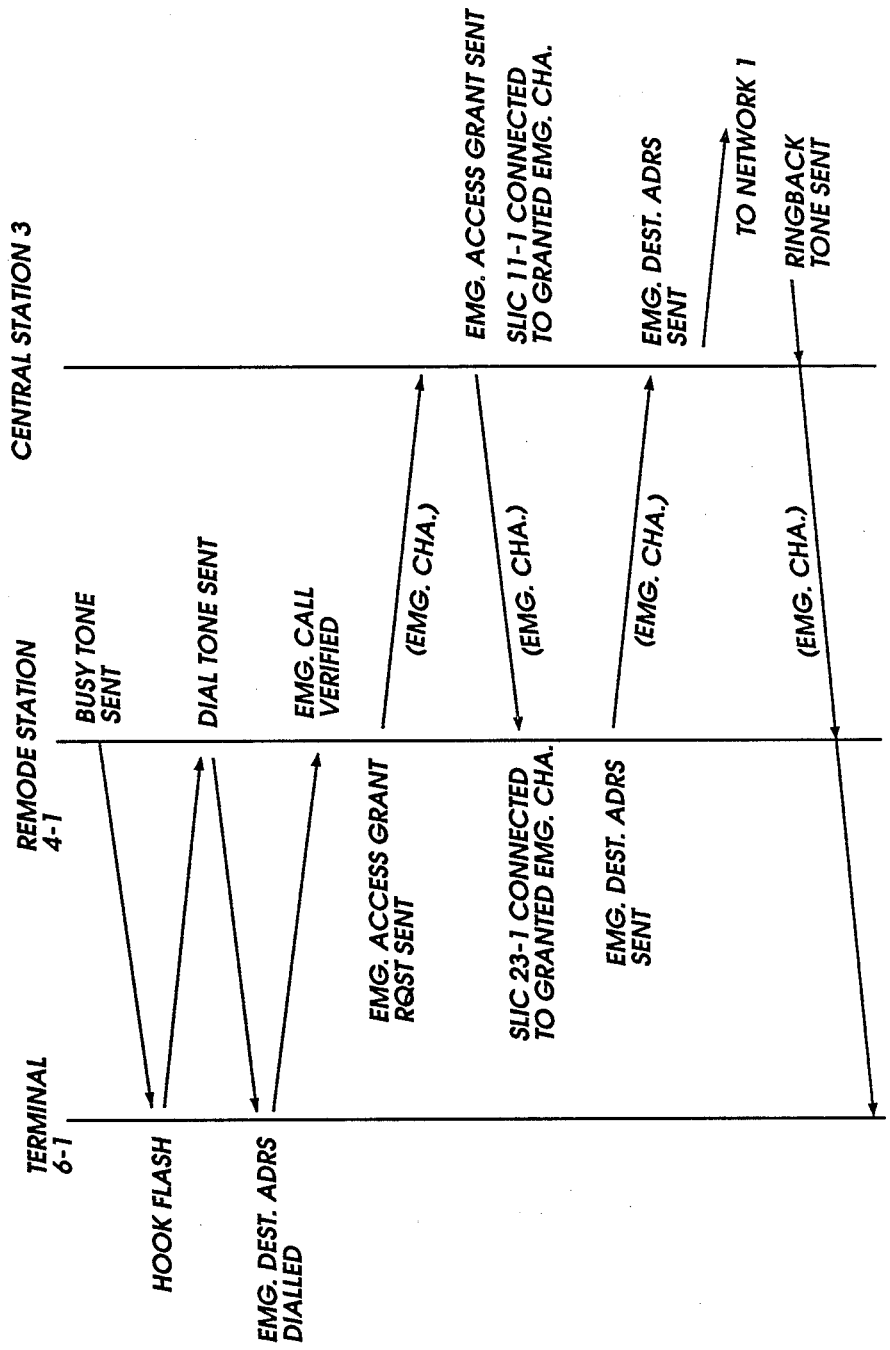

REMOTE CONTROLLER 24

CENTRAL CONTROLLER 14

CONCENTRATOR SYSTEM CAPABLE OF COMPLETING EMERGENCY CALLS UNDER CONGESTED TRAFFIC

BACKGROUND OF THE INVENTION

The present invention relates to a concentrator system for connecting geographically scattered subscriber terminals to the public switched telecommunication network through limited channel resources. More specifically, the invention relates to such a concentrator system in which emergency calls to police departments or fire stations are completed through a specially reserved channel.

Radio concentrator systems have been developed as an economic means for connecting remotely located subscriber terminals, such as telephones and data terminals, to an access point of the public switched telephone network through demand-assigned time division access channels. The system comprises a central station located relatively close to the access point of the network and a plurality of remote stations to which the subscriber terminals are connected by groups. Because of the limited number of demand-assigned channels, congestion tends to occur at peak traffic loads. With prior art radio concentrator systems, an emergency call from ordinary subscribers is treated as an ordinary call and routed through one of the demand-assigned channels if it is available. The prior art system is provided with one or more channels which are specially preassigned to special subscribers to allow them to complete an emergency call under congested traffic. However, an emergency call from ordinary subscribers must be abandoned when it encounters a condition indicating that all channels are busy.

SUMMARY OF THE INVENTION

It is therefore an object of the present invention to provide a concentrator system which allows an emergency call from any subscriber to be completed when the demand-assigned channels are congested with traffic.

In a concentrator system of the present invention, demand-assigned speech or data channels are constantly monitored by the central station to detect when they are congested. When an emergency call is received from a subscriber terminal, typically in the form of a "hook flash", or momentary depression of the switchhook, a dial tone is sent to the terminal if the emergency call occurs simultaneously with the detection of the channel congestion. On hearing the dial tone, the subscriber dials an emergency destination address, which is received by a remote station and compared with a list of predetermined addresses and verified if it matches one of the predetermined addresses. The dialled information is sent from that remote station to the central station, where it is relayed to an access point of the switched telecommunication network. An emergency channel is then established between the subscriber terminal and the network for routing the emergency call.

The emergency channel may be permanently provided in the transmission link between the central station and remote stations and demand-assigned by the central station to a remote station in response to an emergency channel assignment request therefrom or first selected by the remote station requesting an emergency call and access is granted to it if no collision occurs between competing emergency call attempts. Alternatively, no emergency channel is provided in the system and one of the data channels is cleared when an emergency call is detected simultaneously with the occurrence of a condition indicating all data channels are busy. The cleared channel is used as an emergency channel to complete the emergency call.

In a more specific aspect, the concentrator system of the present invention is made up of a central station and a plurality of remote stations interconnected by a two-way transmission link. The central station comprises a plurality of subscriber line interface circuits associated in a one-to-one correspondence to the subscriber terminals and connected to the switched telecommunication network, and a controller cooperating with the subscriber line interface circuits for selecting a data channel in the transmission link in response to a channel assignment request either from the network and the remote stations and generating a data channel selection signal identifying the selected data channel. The controller detects when all of the data channels are busy and generates an all-busy signal. In the central station, multiplexer/demultiplexer circuitry connects the subscriber line interface circuits to the selected data channels in response to the data channel selection signal, connects one of the subscriber line interface circuits from which an emergency call is requested to the transmission link, connects the data channel selection signal and the all-busy signal to the link for transmission to the remote stations, and applies the channel assignment request, which has been received from the remote stations through the link, to the central station controller. The multiplexer/demultiplexer further detects an emergency destination address transmitted from the remote stations on the link. A dialling circuit is provided in the central station for signalling the detected emergency destination address to the network. Each of the remote stations comprises a plurality of remote subscriber line interface circuits connected respectively to the subscriber terminals and a plurality of registers associated respectively with the subscriber terminals for transmitting a dial tone to the emergency call requesting subscriber terminal and receiving the emergency destination address therefrom. A remote controller in each remote station cooperates with the remote subscriber line interface circuits to generate the channel assignment request in response to an outgoing call request from the subscriber terminals and detect a simultaneous occurrence of the all-busy signal from the central station and an emergency call from the emergency requesting subscriber terminal. The remote controller causes one of the registers to send dial tone to the emergency call requesting subscriber terminal in response to the detection of the simultaneous occurrence, and verifies the emergency call by detecting a coincidence between the received destination address with a list of predetermined emergency destination addresses. Remote station multiplexer/demultiplexer circuitry establishes connection of the remote subscriber line interface circuits to the selected data channels in response to the data channel selection signal, connection of one of the remote subscriber line interface circuits which is associated with the emergency call requesting subscriber terminal to the transmission link, connection of the channel assignment request and the emergency destination address of the verified emergency call to the transmission link, and provides connection of the data channel selection signal and the all-busy signal, which have been transmitted from the central station on the link, to the remote controller.

BRIEF DESCRIPTION OF THE DRAWINGS

The present invention will be described in further detail with reference to the accompanying drawings, in which:

FIG. 4C is a data flow diagram useful for understanding the operation of the first embodiment;

FIGS. 5A and 5B are flowcharts describing the operation of the concentrator system according to a second embodiment of the present invention, and FIG. 5C is a data flow diagram useful for understanding the operation of the second embodiment.

DETAILED DESCRIPTION

Figure 1:
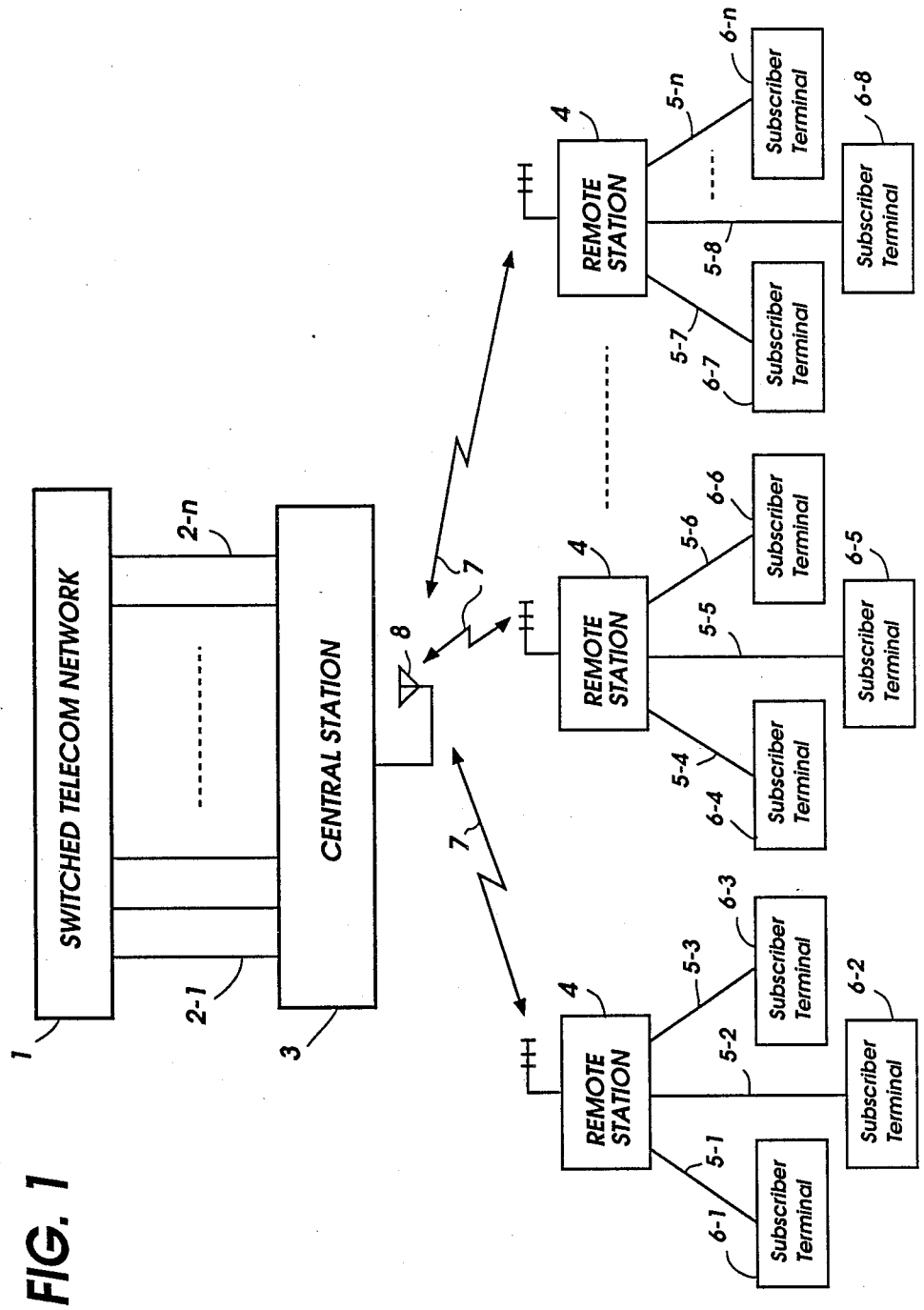
FIG. 1 is a block diagram of a radio concentrator system embodying the present invention.

A radio concentrator system of this invention, shown schematically in FIG. 1, is a subscriber connection system for economically connecting geographically scattered remote subscribers over time division multiplex access (TDMA) radio links to a nearby access point, or telephone exchange, of the public switched telecommunication network 1.

The radio concentrator system comprises a central station 3 located relatively close to the telephone exchange and a plurality of remote stations 4. The exchange side of the central station 3 is coupled to subscriber line terminals of the telephone exchange through exchange subscriber lines 2-1 through 2-n, usually of metallic twisted pairs, and the remote-station side of the central station 3 is a radio access point represented by an antenna 8 which is coupled by TDMA radio links 7 to the central-station side of remote stations 4. Subscriber terminals 6-1 through 6-n such as telephones and data terminals are connected by groups to the subscriber side of nearby remote stations 4 through remote subscriber lines 5-1 through 5-n having one-to-one correspondence to the exchange subscriber lines 2-1 through 2-n. The number of subscriber terminals handled by a single radio concentrator system depends on their traffic volume and the number of commonly shared speech or data channels, or time slots, available over the TDMA links 7. Control signals are exchanged between the central station 3 and remote stations 4 over a control channel exclusively reserved for this purpose in the transmission links 7.

Figure 2:
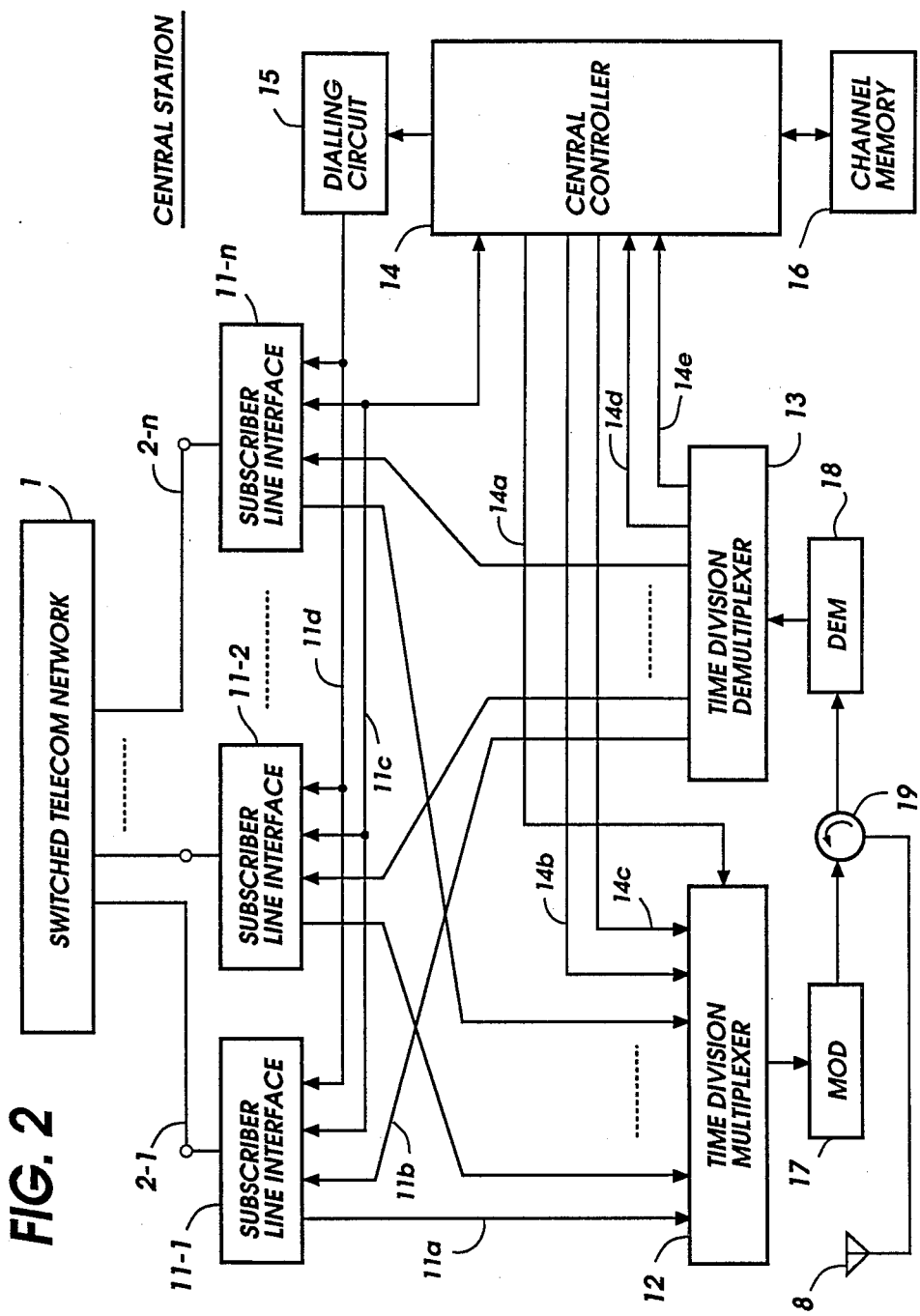
FIG. 2 is a block diagram of the central station of FIG. 1.

Referring to FIG. 2, the central station 3 includes subscriber line interface circuits (SLIC) 11-1 through 11-n connected respectively to the exchange subscriber lines 2-1 through 2-n. Each subscriber line interface circuit 11 is provided with a hybrid which converts the two-wire subscriber line 2 to a four-wire circuit having an outgoing line 11a connected to a respective input of a time division multiplexer 12 and an incoming line 11b connected from a respective output of a time division demultiplexer 13. Subscriber line interface circuits 11 are connected by a respective two-way line 11c to a central controller 14 to exchange control signals with the network 1 and are connected by a line 11d to the output of a dialling circuit 16 which operates to dial an emergency call destination address as will be described later. Time division multiplexer 12 is associated with the central controller 14 to multiplex signals from the line interface circuits 11 into a selected idle speech channel in response to a control signal supplied on a control line 14a from the controller 14.

Control signals to be supplied to the remote stations are carried on a line 14b from the controller 14 to an associated input of the multiplexer 12 and emergency call signals are supplied on a line 14c and fed to an associated input of the multiplexer. These control signals are respectively transmitted on control and emergency channels, or time slots, and multiplexed with other speech signals carried on selected speech channels. The multiplexer output is applied to a modulator 17, where it is modulated on a radio frequency carrier and supplied through a duplexer 19 to the antenna 8, where it is transmitted as a TDM down-direction (towards remote stations 4) in a broadcast mode to the remote stations 4.

Incoming signals from the remote stations 4, detected by antenna 8, are supplied through duplexer 19 to a demodulator 18, the output of which is fed to the demultiplexer 13. Demultiplexer 13 examines the control channel to identify the address of the speech channel signals and connects the identified channels through incoming lines 11b to the appropriate line interface circuits 11. Demultiplexer 13 further separates the control channel, the emergency channel or specified speech channel and supplies control signals carried on the control channel on line 14d to the controller 14 and supplies emergency control signals carried on the emergency or specified speech channel on line 14e to the controller 14.

Controller 14 constantly monitors the busy/idle status of all the TDM channels and updates a channel memory 16. This channel memory is called upon by the central controller 15 each time as it assigns a speech channel to a call request from any of the subscriber terminals 6 or from the telephone network 1. When all the speech channels are busy, an "all busy" signal is broadcast to the remote stations.

Figure 3:
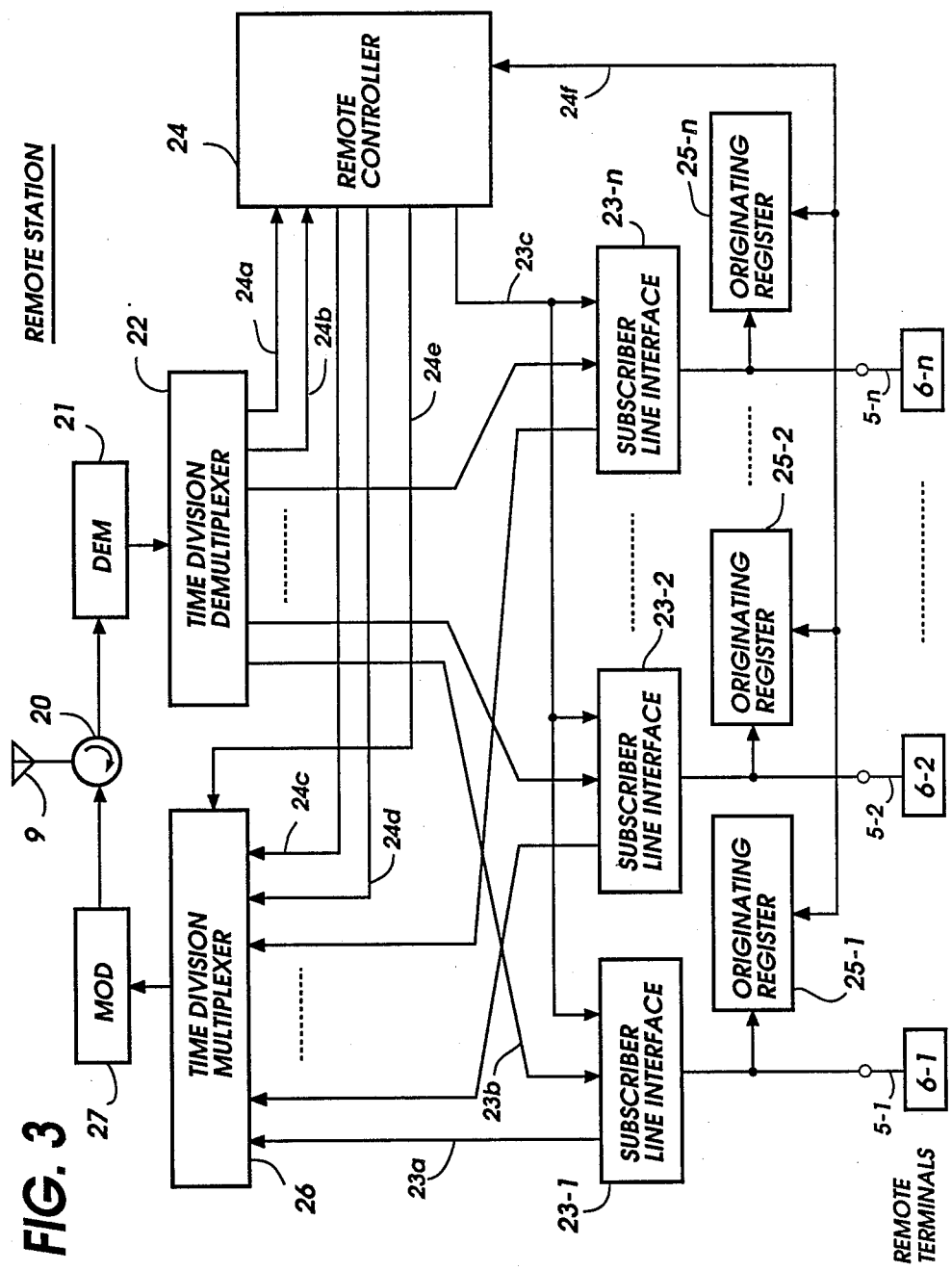
FIG. 3 is a block diagram of each of the remote stations of FIG. 1.

In FIG. 3, each remote station 4 receives the broadcast TDM signal from the central station 3 via antenna 9 and duplexer 20. A demodulator 21 recovers the baseband TDM signal and feeds a time division demultiplexer 22 where the signal is demultiplexed into respective channel components. The demultiplexed speech channel signals are supplied on lines 23b to subscriber line interface circuits 23-1 through 23-n which are provided in a one-to-one correspondence to the subscriber terminals 6-1 through 6-n. The demultiplexed channel control signal and emergency control signal are supplied on lines 24a, 24b to a remote controller 24. Originating registers 25-1 through 25-n are associated respectively with subscriber line interface circuits 23-1 through 23-n. As will be described, each register 25 is designed to detect "on-hook" and "off-hook" and "hook flash" conditions when the associated subscriber goes off-hook for originating a call, or goes on-hook for terminating a call and signals the detected subscriber line conditions to the remote controller 24 on line 24f. If a subscriber desires to place an emergency call, but hears a busy tone indicating that all the speech channels are busy. The subscribers instructed to momentarily depress the switchhook under such conditions to alert the system of an emergency. The register detects the a "hook flash" condition and sends a dial tone to the requesting terminal to urge the subscriber to dial the desired emergency call destination. The emergency destination address is detected by the originating register 25 and fed to the remote controller 24 to be transmitted to central station 3.

Each subscriber line interface circuit 23 has an outgoing line 23a connected to a respective input of a time division multiplexer 26 to which the channel control signal and emergency control signal from the remote controller 24 are also supplied on lines 24c, 24d. Multiplexer 26 is controlled in response to a channel identification signal supplied on line 24e from the remote controller 24. The output of multiplexer 26 is coupled to a modulator 27 where the baseband TDM signal is modulated on a radio frequency carrier and applied through duplexer 20 to antenna 9 and transmitted to the central station as a TDM up-direction signal.

Central controller 14 and remote controller 24 are implemented by microprocessor-based controllers each being programmed according to embodiments of the present invention.

Figure 4A:
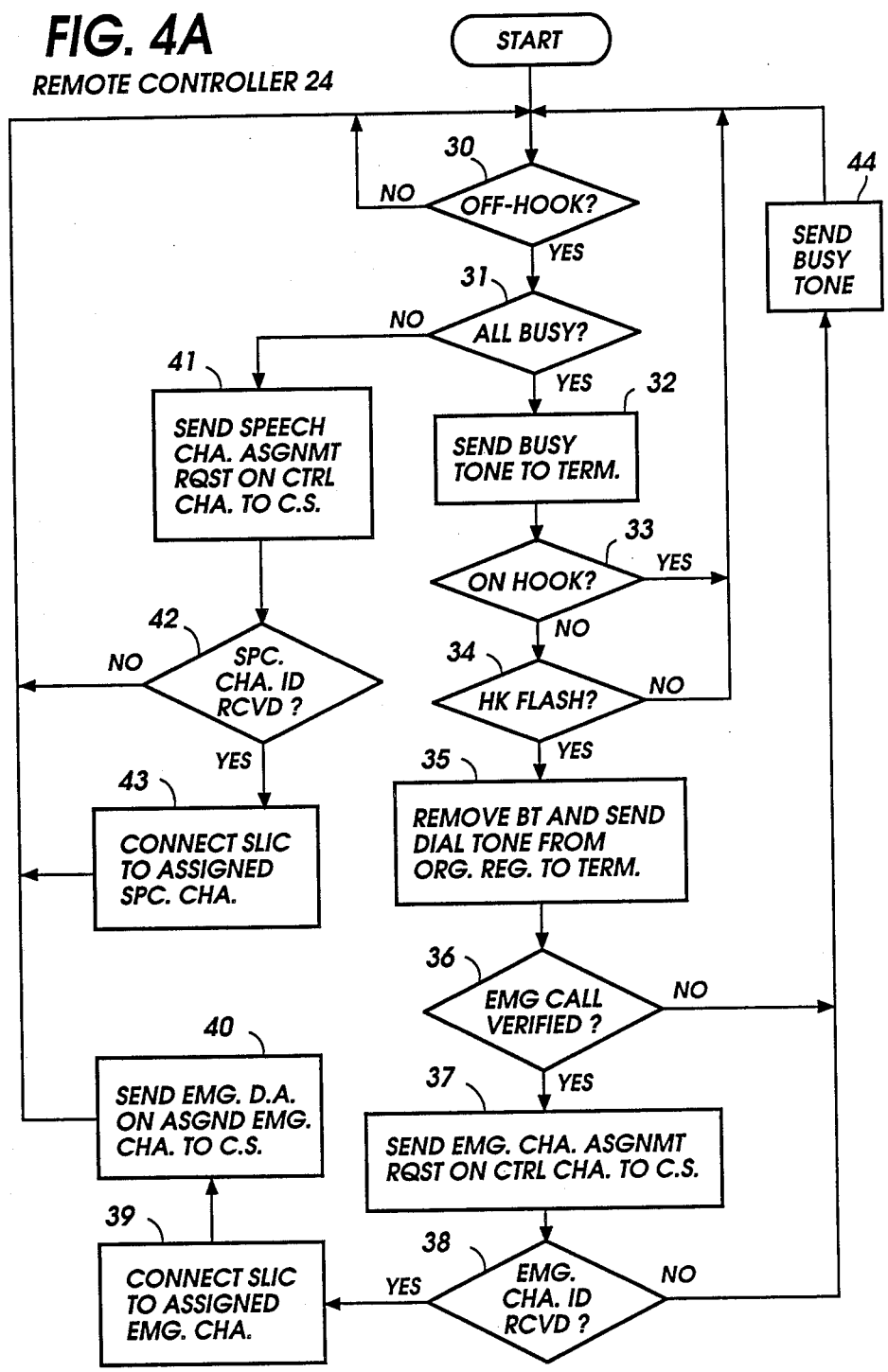
FIGS. 4A and 4B are flowcharts describing the operation of the concentrator system according to a first embodiment of the present invention.
Figure 4B:
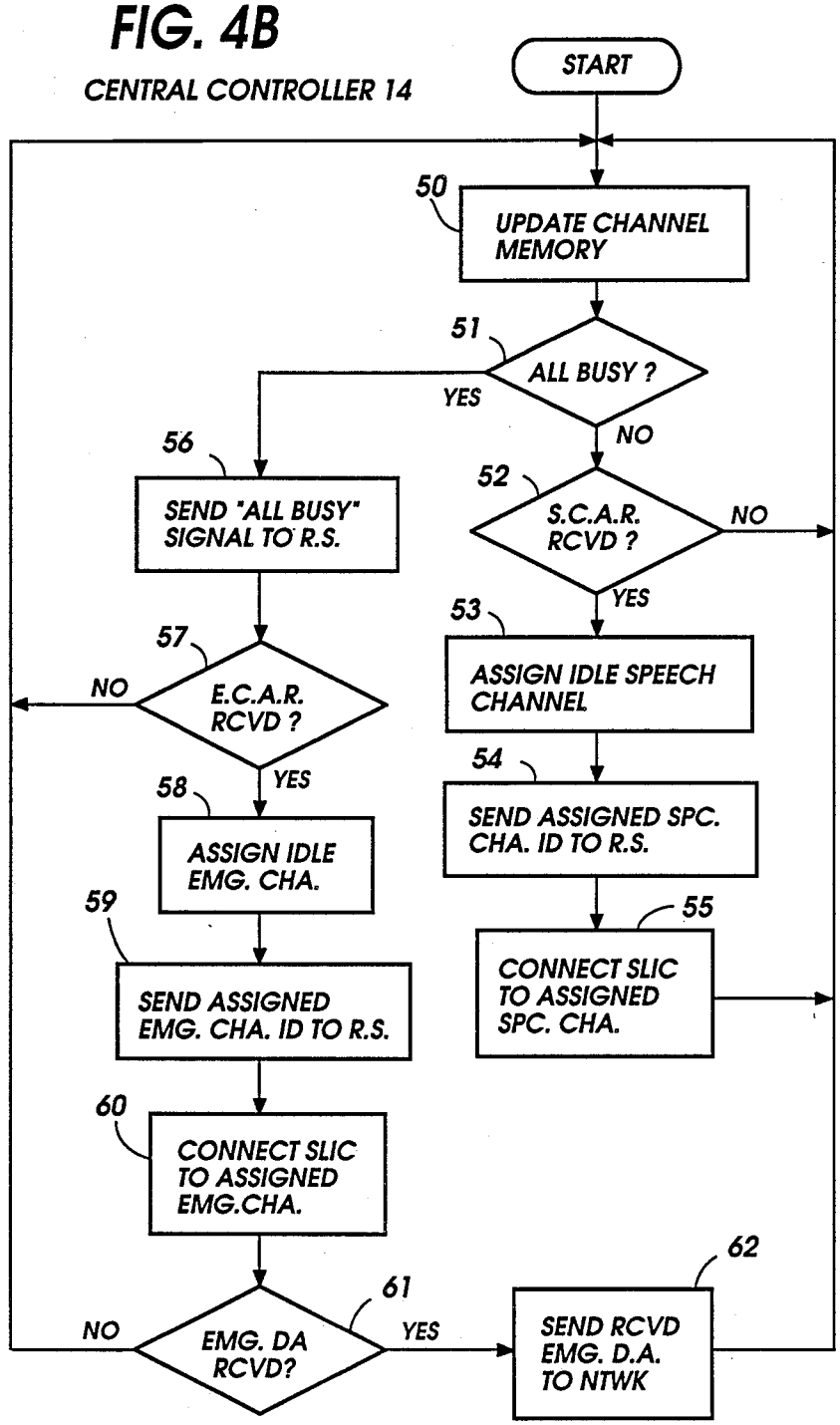
Figure 7:
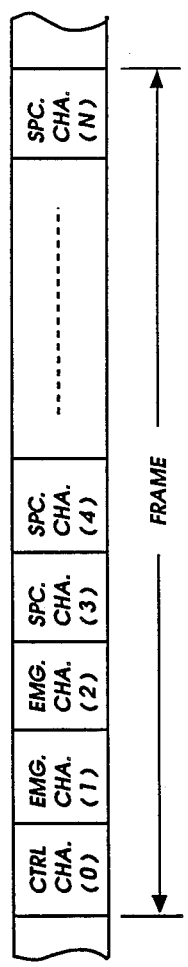
FIG. 7 shows a data format employed in the first and second embodiments of the invention.

FIGS. 4A and 4B are flowcharts describing the operations of remote and central controllers 24 and 14, respectively, according to a first embodiment of the present invention. Each of the TDM up- and down-direction links of the first embodiment is divided into time slots as shown in FIG. 7. Time slot #0 is exclusively used for the transmission channel control and system management control signals and time slots #1 and #2 are reserved for emergency calls. The other time slots are speech channels for carrying speech signals. In FIG. 4A, the program execution of remote controller 24 starts with a decision block 30 which checks to see if any of the subscriber terminals goes off-hook. If an off-hook condition occurs, an associated originating register 25 issues a call request to the controller 24 and the program control proceeds to a decision block 31 to detect whether the controller 24 has received an "all busy" signal on the control channel from the central station.

If there is an idle speech channel in the transmission link, the answer is negative in block 31, exit is to operations block 41 which directs the sending of a speech channel assignment request (SCAR) to the central station on the control channel to elicit a response from the central station indicating the identification of an assigned speech channel. Control then proceeds to decision block 42 to check for the reception of such a response.

As will be understood as the description proceeds, the central controller 14 receives the speech channel assignment request, selects an idle speech channel by looking up the contents of the channel memory 16 and assigns the selected channel to the requesting subscriber. Central controller 14 proceeds to send the identification number (ID) of the selected speech channel on the control channel to the remote station and establishes a connection between the subscriber line interface circuit (SLIC) 11 concerned with the assigned speech channel. The ID of the selected speech channel is received by the remote controller 24 (block 42), which is followed by operations block 43 to establish a connection between the subscriber line interface circuit 23 of the calling subscriber to the assigned speech channel, thus setting up a dialling connection.

If all the speech channels are busy, the remote controller 24 has received an "all busy" signal from the central station and the answer is affirmative in block 31. Exit then is to operations block 32 which directs the sending of a busy tone from the associated subscriber line interface circuit 23 to the calling subscriber and thence to decision blocks 33 and 34 to check to see if the subscriber goes on-hook or momentarily depresses the switchhook. If the subscriber goes on-hook on hearing the busy tone, control returns to block 30. If the subscriber wants to place an emergency call, he will momentarily depress the switchhook, sending a "hook flash" signal to the remote controller 24. Thus, control exits from block 34 to operations block 35 which directs the removing of the busy tone and sending of a dial tone from the associated originating register 25 to the subscriber terminal to urge the subscriber to dial an emergency destination address.

Exit then is to decision block 36 to receive and store the emergency destination address in memory and verify the emergency call. This is accomplished by detecting a match between the dialled emergency destination address against a list of emergency destination addresses stored in the remote controller 24. If no match occurs, control goes to operations block 44 to send a busy tone to the susbscriber. If the call is verified, control proceeds to operations block 37 which directs the sending of an emergency channel assignment request (ECAR) on the control channel to the central station 3 to elicit a response from the central station indicating the identification of an assigned emergency channel, and then exits to decision block 38 to check for the reception of the emergency channel identification number. Exit then is to operations block 39 which directs the switching of the subscriber line interface circuit 23 concerned to the assigned emergency channel and thence to operations block 40 to transmit the stored emergency destination address to the central station on the assigned emergency channel.

As will be described, this emergency call request will be received by the central controller 14 and one of the emergency channels is selected and assigned to the calling subscriber. The ID of the selected emergency channel is returned on the control channel and the reception of this signal is confirmed by the remote station concerned (block 38). If no emergency channels are available, exit is to block 44 to send a busy tone to the subscriber.

In FIG. 4B, the program execution of the central controller 14 begins with operations block 50 which directs the updating of the channel memory 16 with an assigned channel identification number. Exit then is to decision block 51 which checks to see if all the speech channels are busy and proceeds to operations block 56 to send an "all busy" signal on control channel if the answer is affirmative or proceeds to decision block 52 if the answer is negative. With block 52, the remote controller 24 awaits the arrival of a speech channel assignment request (SCAR) from a remote station requesting an ordinary or emergency call. On receiving a SCAR signal, control exits to operations block 53 which directs the selecting of an idle speech channel using the information stored in the channel memory 16 and the assigning of the selected speech channel to the calling subscriber. Exit then is to operations block 54 to transmit the ID of the assigned speech channel to the remote station on the control channel and advances to operations block 55 to connect the subscriber line interface circuit 11 of the calling subscriber to the assigned speech channel. Thus, control loops through blocks 50 to 55 when a call request is received from any of the remote stations provided that at least one speech channel is available.

With block 56, the central controller 14 sends an "all busy" signal to remote stations 4 and proceeds to block 57 to check for the arrival of an emergency channel assignment request (ECMR). If there is one, control proceeds to operations block 58 to select an idle emergency channel and assign it to the emergency calling subscriber and advances to operations block 59 to send the ID of the assigned emergency channel on the control channel to the remote station. Exit then is to operations block 60 which directs the connection of the subscriber line interface circuit 11 of the emergency caller to the assigned emergency channel and control proceeds to decision block 61 to receive a dialled emergency destination address from the remote station on the assigned emergency channel. On receiving the emergency destination address, central controller 14 supplies it to the dialling circuit 15, whereupon it dials the received address to the public network 1 through the subscriber line interface circuit 11 of the emergency calling subscriber (block 62).

To summarize the operation of the first embodiment of the invention, FIG. 4C shows a sequence of events that occur when an emergency call is originated from terminal 6-1, for example, under an all-busy condition. A hook-flash signal from the terminal 6-1 is detected by remote station 4-1 (block 34), causing a dial tone to be sent to the terminal 6-1 (block 35) from remote station 4-1 to urge the subscriber to dial a desired emergency destination address. After verifying the dialled information, remote station 4-1 sends an emergency channel assignment request on the control channel to central station 3 (block 37) and received by the central controller 14 (block 57). An idle emergency channel is assigned to the terminal 6-1 (block 58) and the identification of the assigned emergency channel is sent from central station 3 to remote station 4-1 (block 59) on the control channel. The emergency channel ID is received by remote controller 24 (block 38). Subscriber line interface circuits 23-1 and 11-1 of the remote and central stations are connected to the assigned emergency channel (blocks 39,60) and the dialled destination address is sent from remote station 4-1 to central station 3 (block 40) and then relayed to the public network 1 (blocks 61, 62) to establish a connection between the terminal 6-1 and the emergency destination.

Figure 5A:
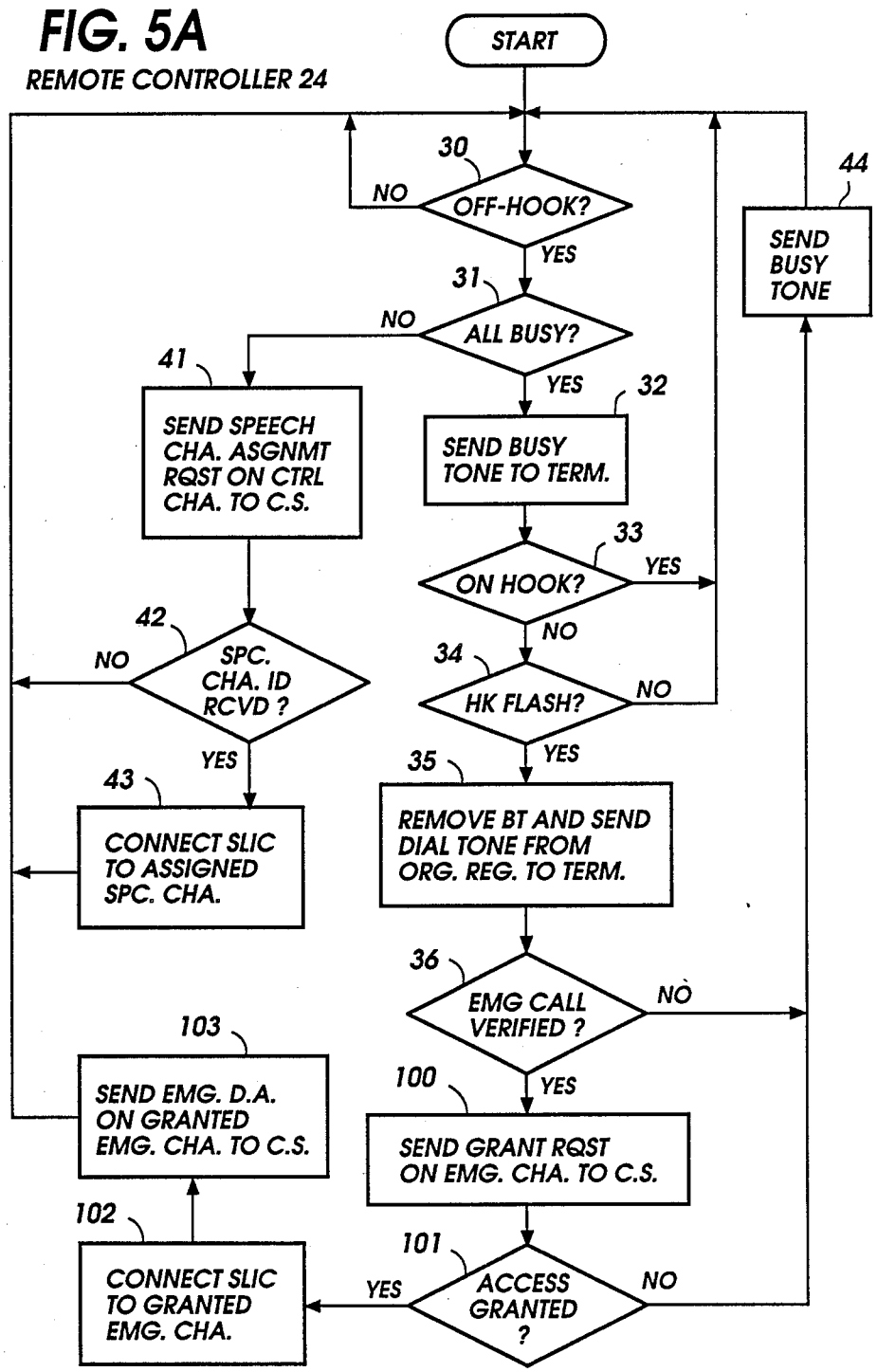

A second embodiment of the present invention is shown in FIGS. 5A, 5B and 5C. This embodiment differs from the first embodiment in that it includes blocks designated 100 through 107. After verifying the emergency call (block 36) from terminal 6-1, the remote controller 24 of station 4-1 proceeds to operations block 100 which directs the sending of an emergency access grant request (EAGR) signal on one of the emergency channels to central station 3. This EAGR signal is received by central station 3 (block 104). Control proceeds to decision block 105 to check to see if there is a collision with another emergency call. If there is one, control returns to block 50, and if there is none, exit is to operations block 106 which directs the sending of an access grant signal on the emergency channel to the remote station 4-1 and control advances to operations block 107 to connect the subscriber line interface circuit 11-1 to the granted emergency channel. When this grant signal is received by remote station 4-1 (block 101), the remote controller 24 proceeds to block 102 to connect the subscriber line interface circuit 23-1 to the granted emergency channel. Exit then is to operations block 103 which directs the sending of the stored emergency destination address on the granted emergency channel to the central station. Central station 3 receives the emergency destination address (block 61) for transmission to the network 1 through dialling circuit 15 (block 62). It is seen that with the second embodiment of the invention all control signals are sent via one of the emergency channels and the central station operates to grant permission to the use of the emergency channel if no data collision occurs between emergency calls.

Figure 6A:
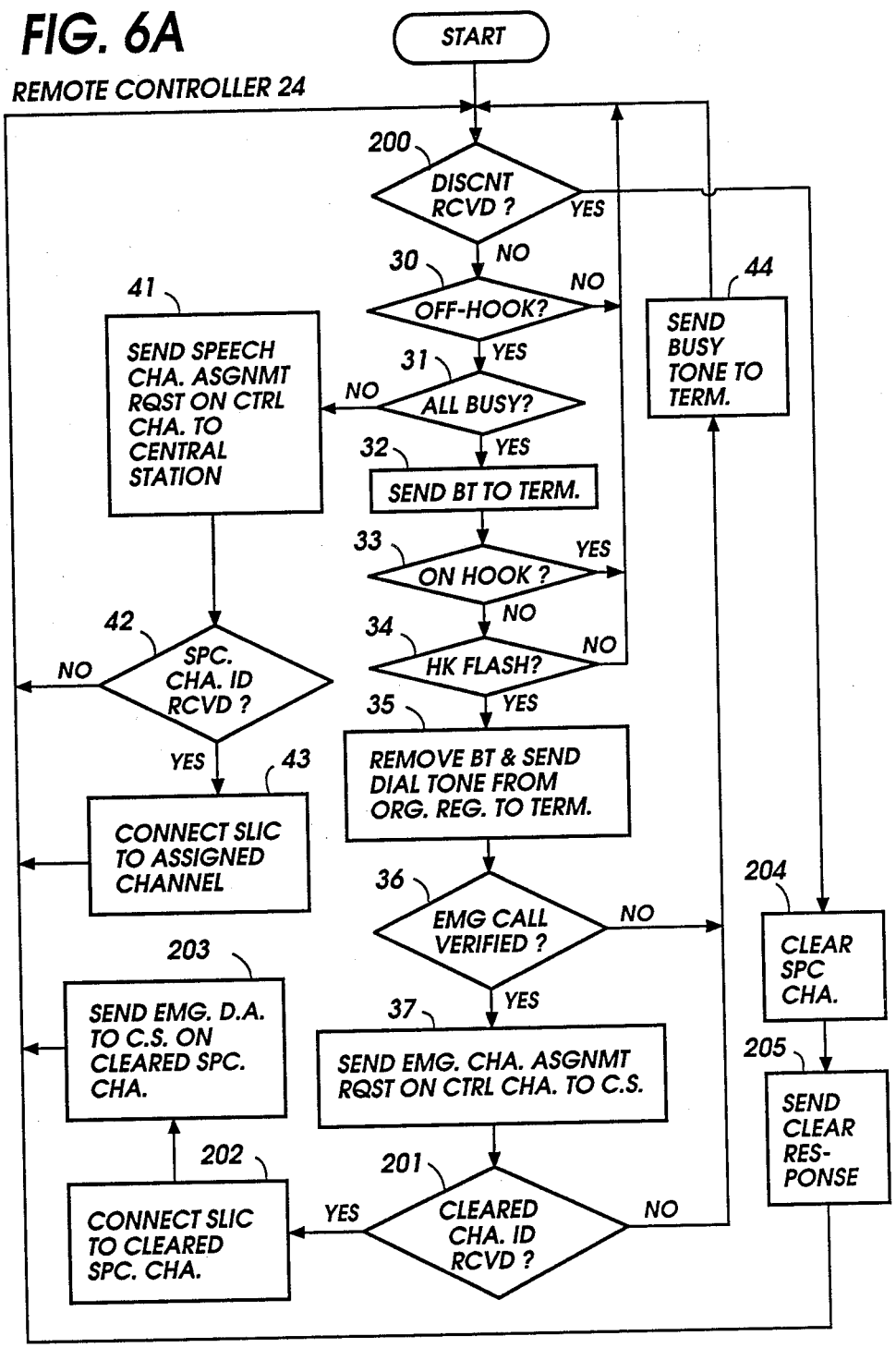
FIGS. 6A and 6B are flowcharts describing the operation of the concentrator system according to a second embodiment of the present invention.
Figure 6B:
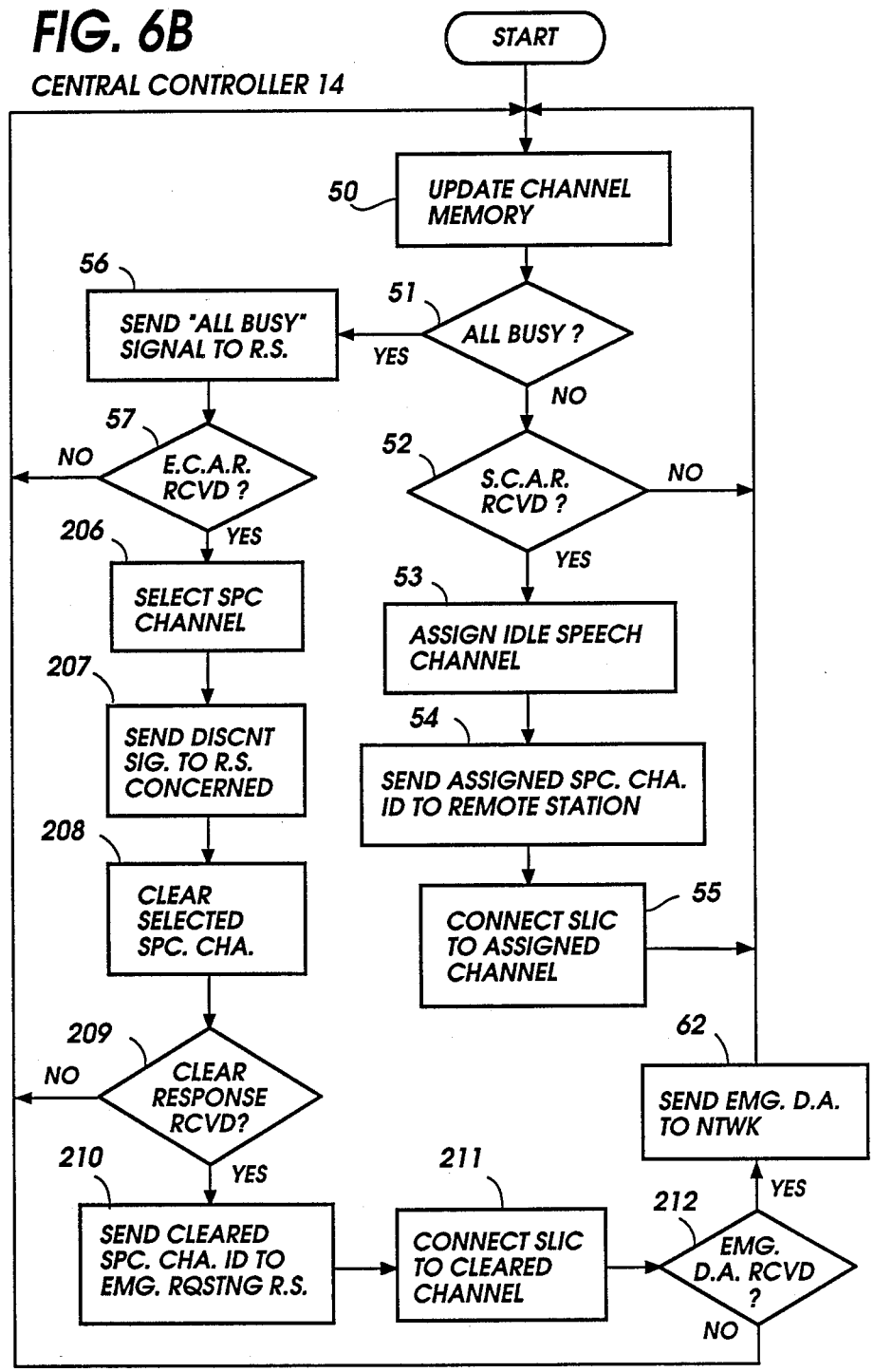
Figure 6C:
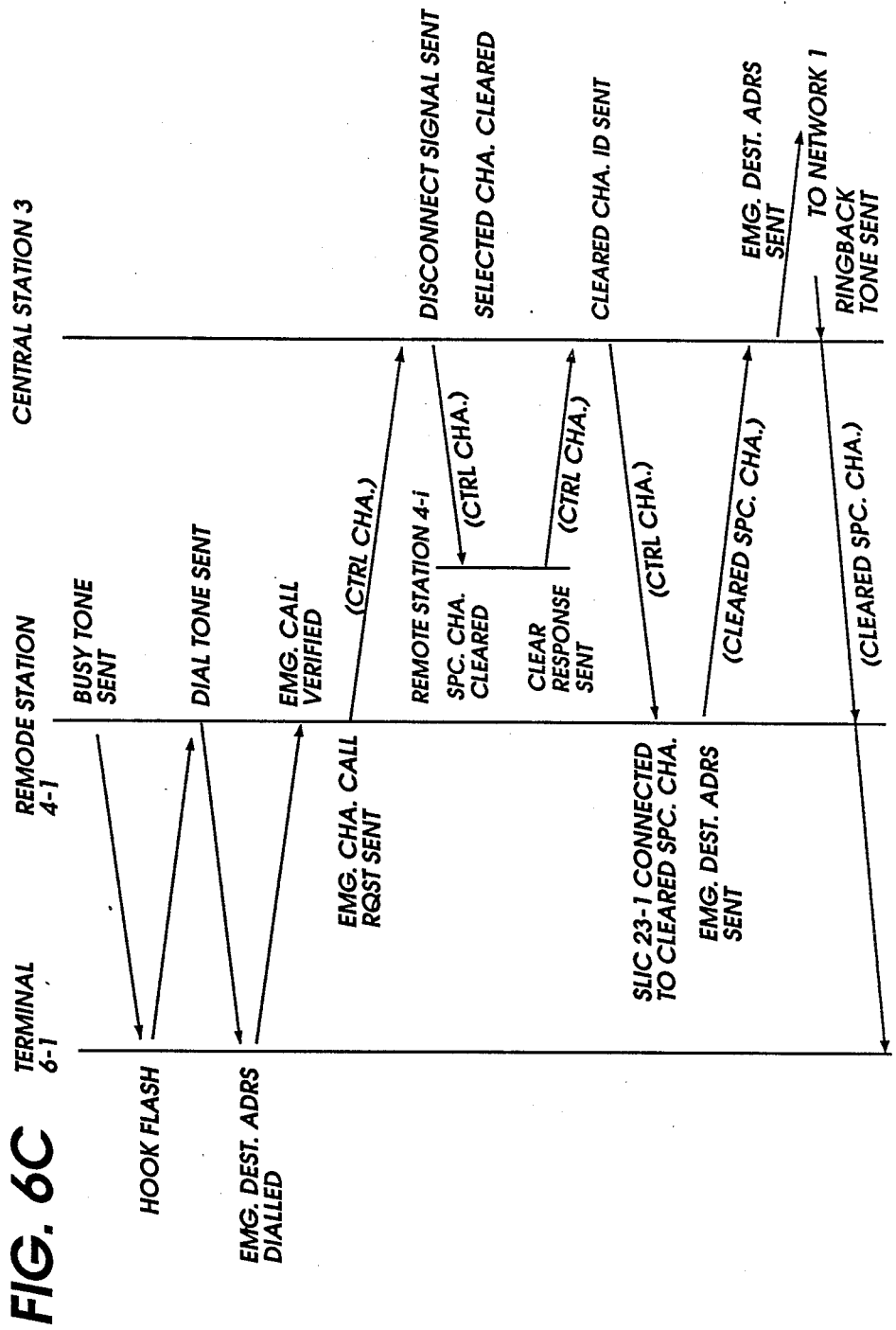
FIG. 6C is a data flow diagram useful for understanding the operation of the third embodiment.
Figure 8:
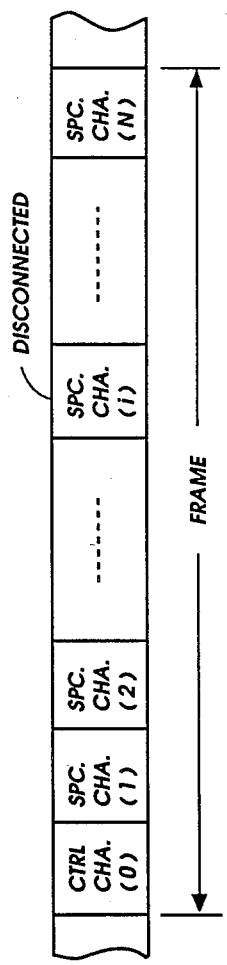
FIG. 8 shows a data format employed in the third embodiment of the present invention.

A third embodiment of the present invention is shown in FIGS. 6A, 6B and 6C. The third embodiment differs from the first embodiment of the invention in that it includes blocks designated 200 through 212. In this embodiment, emergency channels are not provided as shown in FIG. 8 and emergency calls established when an all busy condition exits by forcibly clearing one of the speech channels which may be used by a remote station other than the emergency requesting remote station 4-1. The program starts decision block 200 which checks for the reception of a disconnect signal from central station 3. If there is none, exit is to decision block 30 to perform executions similar to those of FIG. 4A until control proceeds to block 37 in which the remote station, i.e., station 4-1 requesting the emergency call under an all busy condition sends an emergency channel assignment request on the control channel to the central station. On receiving this request (block 57, FIG. 6B), the central station proceeds to operations block 206 to select one of the speech channels and transmits a disconnect signal indicating the channel number of the selected speech channel on the control channel to a remote station associated with the cleared channel (block 207). Exit then is to operations block 208 which directs the clearing of the selected channel and thence to decision block 209 which checks to see if a clear response signal is received.

The remote station, which is associated with the speech channel to be cleared, receives the disconnect signal addressed to it (block 200, FIG. 6A) and proceeds to operations block 204 which directs the clearing of a speech channel specified by the received disconnect signal. Exit then is to operations block 205 which directs the sending of a clear response signal to central station 3 on the control channel indicating that the specified speech channel has been cleared. On receiving the clear response signal (block 209, FIG. 6B), the central station proceeds to operations block 210 which directs the sending of the identification number of the cleared speech channel to the emergency call requesting station and thence to operations block 211 which directs the connecting of the subscriber line interface circuit 11-1 to the cleared channel. The cleared channel identification signal is received by remote station 4-1 (block 201) and the latter proceeds to operations block 202 which directs the connecting of the subscriber line interface circuit 23-1 to the cleared speech channel. Exit then is to operations block 203 which directs the sending of the stored emergency destination address on the cleared channel to the central station. On receiving the destination address signal (block 212), the central station advances to operations block 62 to send the emergency destination address through dialling circuit 15 to the network 1.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A concentrator system for connecting subscriber terminals to a switched telecommunication network through a plurality of demand-assigned two-way data channels, comprising:
    means for detecting when said data channels are congested;
    means for detecting an emergency call from one of said subscriber terminals occurring simultaneously with the detection of said congested channels;
    means for sending a dial tone to said one subscriber terminal when said emergency call is detected simultaneously with the detection of the congested channels to allow an emergency destination address to be dialled from said terminal and receiving said dialled emergency destination address;
    means for verifying said emergency call by comparing said received address with a list of predetermined addresses; and
    means responsive to the verification of said emergency call for transmitting said received emergency destination address from said system to said network and establishing an emergency channel between said subscriber terminal and said network.

2. A concentrator system as claimed in claim 1, wherein said emergency call is indicated by a hook flash signal generated when said one subscriber terminal momentarily depresses a switchhook.

3. A concentrator system as claimed in claim 1, further comprising means for clearing one of said data channels when said emergency call is detected simultaneously with said channel all busy and establishing said emergency channel through said cleared data channel.

4. A concentrator system for connecting subscriber terminals to a switched telecommunication network, said system having a central station and a plurality of remote stations to which said subscriber terminals are connected, said central station and said remote stations being interconnected by a two-way transmission link having a plurality of data channels and an auxiliary two-way channel:
    wherein said central station comprises:
    a plurality of central subscriber line interface circuits associated in a one-to-one correspondence to said subscriber terminals and connected to said switched telecommunication network;
    a central controller cooperating with said central subscriber line interface circuits for selecting one of said data channels in response to a channel assignment request either from said network and said remote stations and generating a data channel selection signal identifying the selected data channel, and detecting when all of said data channels are busy and generating an all-busy signal;
    central multiplexer/demultiplexer means for coupling said central subscriber line interface circuits to said selected data channels in response to said data channel selection signal, coupling one of said central subscriber line interface circuits which is associated with a subscriber terminal requesting an emergency call to said auxiliary channel, coupling said data channel selection signal and said all-busy signal to said auxiliary channel, coupling said channel assignment request transmitted from said remote stations on said auxiliary channel to said central controller and detecting an emergency destination address transmitted from said remote stations on said auxiliary channel; and
    a dialling circuit for signalling said detected emergency destination address to said network,
    wherein each of said remote stations comprises:
    a plurality of remote subscriber line interface circuits connected respectively to said subscriber terminals;
    register means associated respectively with said subscriber terminals for transmitting a dial tone to said emergency call requesting subscriber terminal and receiving said emergency destination address therefrom;
    a remote controller cooperating with said remote subscriber line interface circuits for generating said channel assignment request in response to an outgoing call request from said subscriber terminals and detecting a simultaneous occurrence of said all-busy signal from said central station and an emergency call from said emergency requesting subscriber terminal, causing said register means to send dial tone to the emergency call requesting subscriber terminal in response to the detection of said simultaneous occurrence, and verifying said emergency call by detecting a coincidence between said received destination address with a list of predetermined emergency destination addresses; and
    remote multiplexer/demultiplexer means for coupling said remote subscriber line interface circuits to said selected data channels in response to said data channel selection signal, coupling one of said remote subscriber line interface circuits to said auxiliary channel which is associated with said emergency call requesting subscriber terminal, coupling said channel assignment request and said emergency destination address of the verified emergency call to said auxiliary channel, and coupling said data channel selection signal and said all-busy signal transmitted from said central station on said auxiliary channel to said remote controller.

5. A concentrator system for connecting subscriber terminals to a switched telecommunication network, said system having a central station and a plurality of remote stations to which said subscriber terminals are connected, said central station and said remote stations being interconnected by a two-way transmission link having a plurality of commonly shared two-way data channels, a two-way signalling channel and a plurality of two-way emergency channels:
    wherein said central station comprises:
    a plurality of central subscriber line interface circuits associated in a one-to-one correspondence to said subscriber terminals and connected to said switched telecommunication network;

a central controller cooperating with said central subscriber line interface circuits for selecting one of said data channels in response to a data channel assignment request either from said network and said remote stations and generating a data channel selection signal identifying the selected data channel, selecting one of said emergency channels in response to an emergency channel assignment request from said remote stations and generating an emergency channel selection signal identifying the selected emergency channel, and detecting when all of said data channels are busy and generating an all-busy signal;

central multiplexer/demultiplexer means for coupling said central subscriber line interface circuits to said selected data channel in response to said data channel selection signal, coupling one of said central subscriber line interface circuits which is associated with a subscriber terminal requesting an emergency call to said emergency channel, coupling said data channel selection signal, said emergency channel selection signal and said all-busy signal to said signalling channel, coupling said data channel assignment request transmitted from said remote stations on said signalling channel to said central controller and detecting an emergency destination address transmitted from said remote stations on said emergency channel; and a dialling circuit for signalling said detected emergency destination address to said network, wherein each of said remote stations comprises:

a plurality of remote subscriber line interface circuits connected respectively to said subscriber terminals;

register means associated respectively with said subscriber terminals for transmitting a dial tone to said emergency call requesting subscriber terminal and receiving said emergency destination address therefrom;

a remote controller cooperating with said remote subscriber line interface circuits for generating said data channel assignment request in response to an outgoing call request from said subscriber terminals and generating said emergency channel assignment request in response to an emergency call from said emergency call requesting subscriber terminal, detecting a simultaneous occurrence of said all-busy signal from said central station and said emergency call, causing said register means to send dial tone to the emergency call requesting subscriber terminal in response to the detection of said simultaneous occurrence, and verifying said emergency call by detecting a coincidence between said received destination address with a list of predetermined emergency destination addresses; and remote multiplexer/demultiplexer means for coupling said remote subscriber line interface circuits to said selected data channels in response to said data channel selection signal, coupling one of said remote subscriber line interface circuits which is associated with said emergency call requesting subscriber terminal to said emergency channel in reponse to said emergency channel selection signal, coupling said channel assignment request to said signalling channel, coupling said emergency destination address of the verified emergency call to said emergency channel, and coupling said data channel selection signal and said all-busy signal transmitted from said central station on said signalling channel to said remote controller.

6. A concentrator system for connecting subscriber terminals to a switched telecommunication network, said system having a central station and a plurality of remote stations to which said subscriber terminals are connected, said central station and said remote stations being interconnected by a two-way transmission link having a plurality of commonly shared, demand-assigned two-way data channels, a two-way signalling channel and a two-way emergency channel:

wherein said central station comprises:

a plurality of central subscriber line interface circuits associated in a one-to-one correspondence to said subscriber terminals and connected to said switched telecommunication network;

a central controller cooperating with said central subscriber line interface circuits for selecting one of said data channels in response to a channel assignment request either from said network and said remote stations and generating a data channel selection signal identifying the selected data channel, detecting whether a collision occurs between emergency call requests from said remote stations and generating an access grant signal when no collision is detected, and detecting when all of said data channels are busy and generating an all-busy signal;

central multiplexer/demultiplexer means for coupling said central subscriber line interface circuits to said selected data channel in response to said data channel selection signal, coupling one of said central subscriber line interface circuits which is associated with a subscriber terminal requesting an emergency call to said emergency channel, coupling said data channel selection signal and said all-busy signal to said signalling channel, coupling said access grant signal to said emergency channel, coupling said channel assignment request transmitted from said remote stations on said signalling channel to said central controller and detecting an emergency destination address transmitted from said remote stations on said emergency channel; and a dialling circuit for signalling said detected emergency destination address to said network, wherein each of said remote stations comprises:

a plurality of remote subscriber line interface circuits connected respectively to said subscriber terminals;

register means associated respectively with said subscriber terminals for transmitting a dial tone to said emergency call requesting subscriber terminal and receiving said emergency destination address therefrom;

a remote controller cooperating with said remote subscriber line interface circuits for generating said channel assignment request in response to an outgoing call request from said subscriber terminals and detecting a simultaneous occurrence of said all-busy signal from said central station and an emergency call from said emergency requesting subscriber terminal, causing said register means to send dial tone to the emergency call requesting subscriber terminal in response to the detection of said simultaneous occurrence, and verifying said emergency call by detecting a coincidence between said received destination address with a list of predetermined emergency destination addresses; and remote multiplexer/demultiplexer means for coupling said remote subscriber line interface circuits to said selected data channels in response to said data channel selection signal, coupling one of said remote subscriber line interface circuits which is associated with said emergency call requesting subscriber terminal to said emergency channel, coupling said channel assignment request to said signalling channel and said emergency destination address of the verified emergency call to said emergency channel, coupling said access grant signal transmitted from said central station on said emergency channel to said remote controller, and coupling said data channel selection signal and said all-busy signal transmitted from said central station on said signalling channel to said remote controller.

7. A concentrator system for connecting subscriber terminals to a switched telecommunication network, said system having a central station and a plurality of remote stations to which said subscriber terminals are connected, said central station and said remote stations being interconnected by a two-way transmission link having a plurality of commonly shared, demand-assigned two-way data terminals and a two-way signalling channel:

wherein said central station comprises:

a plurality of central subscriber line interface circuits associated in a one-to-one correspondence to said subscriber terminals and connected to said switched telecommunication network;

a central controller cooperating with said central subscriber line interface circuits for selecting one of said data channels in response to a data channel assignment request either from said network and said remote stations and generating a data channel selection signal identifying the selected data channel, detecting when all of said data channels are busy and generating an all-busy signal, and specifying one of said data channels in response to an emergency call request from said remote stations and generating a data channel disconnect signal identifying said specified data channel;

central multiplexer/demultiplexer means for coupling said central subscriber line interface circuits to said selected data channels in response to said data channel selection signal, clearing said specified data channel and coupling one of said central subscriber line interface circuits which is associated with a subscriber terminal requesting an emergency call to said cleared data channel in response to said data channel disconnect signal, coupling said data channel selection signal, a said data channel disconnect signal and said all-busy signal to said signalling channel, coupling said data channel assignment request transmitted from said remote stations on said signalling channel to said central controller and detecting an emergency destination address transmitted from said remote stations on signalling channel; and a dialling circuit for signalling said detected emergency destination address to said network, wherein each of said remote stations comprises:

a plurality of remote subscriber line interface circuits connected respectively to said subscriber terminals;

register means associated respectively with said subscriber terminals for transmitting a dial tone to said emergency call requesting subscriber terminal and receiving said emergency destination address therefrom;

a remote controller cooperating with said remote subscriber line interface circuits for generating said channel assignment request in response to an outgoing call request from said subscriber terminals and detecting a simultaneous occurrence of said all-busy signal from said central station and an emergency call from said emergency requesting subscriber terminal, causing said register means to send dial tone to the emergency call requesting subscriber terminal in response to the detection of said simultaneous occurrence, and verifying said emergency call by detecting a coincidence between said received destination address with a list of predetermined emergency destination addresses; and remote multiplexer/demultiplexer means for coupling said remote subscriber line interface circuits to said selected data channels in response to said data channel selection signal, clearing said specified data channel and coupling one of said remote subscriber line interface circuits which is associated with said emergency call requesting subscriber terminal to said cleared data channel in response to said data channel disconnect signal, coupling said channel assignment request and said emergency destination address of the verified emergency call to said transmission link, and coupling said data channel selection signal, said data channel disconnect signal and said all-busy signal transmitted from said central station on said signalling channel to said remote controller.

* * * * *